US012211357B1

(12) United States Patent  
Child et al.

(10) Patent No.: US 12,211,357 B1  
(45) Date of Patent: Jan. 28, 2025

(54) TECHNIQUES FOR INTRUDER DETECTION

(71) Applicant: Vivint, Inc., Provo, UT (US)

(72) Inventors: Michael D. Child, Draper, UT (US); Michelle Zundel, Draper, UT (US); Benjamin A. Clement, American Fork, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 17/182,994

(22) Filed: Feb. 23, 2021

(51) Int. Cl.
*G06V 20/52* (2022.01)
*G06V 40/16* (2022.01)
*G08B 13/196* (2006.01)
*H04L 12/28* (2006.01)

(52) U.S. Cl.
CPC ..... *G08B 13/19613* (2013.01); *G06V 40/172* (2022.01); *G08B 13/19608* (2013.01); *G08B 13/19691* (2013.01); *H04L 12/283* (2013.01)

(58) Field of Classification Search
None
See application file for complete search history.

(56) References Cited

U.S. PATENT DOCUMENTS

| 10,984,641 | B2 | 4/2021 | Modestine et al. | |
| 11,195,398 | B1* | 12/2021 | Fu | G08B 13/19613 |
| 11,501,618 | B1* | 11/2022 | Siminoff | G06V 20/52 |
| 2005/0281435 | A1* | 12/2005 | Aggarwal | H04N 7/185 |
| | | | | 382/103 |
| 2013/0243252 | A1* | 9/2013 | Xu | G06V 10/42 |
| | | | | 382/103 |
| 2014/0015981 | A1* | 1/2014 | Dietl | G08B 13/19632 |
| | | | | 348/159 |
| 2014/0293048 | A1* | 10/2014 | Titus | G08B 13/19656 |
| | | | | 348/143 |
| 2017/0262706 | A1* | 9/2017 | Sun | G06V 20/47 |
| 2018/0165933 | A1* | 6/2018 | Siminoff | G06V 10/62 |
| 2018/0261060 | A1* | 9/2018 | Siminoff | G08B 25/08 |
| 2018/0286201 | A1* | 10/2018 | Lemberger | G08B 13/19606 |
| 2018/0307912 | A1* | 10/2018 | Selinger | G06V 20/41 |
| 2018/0341835 | A1* | 11/2018 | Siminoff | G06V 10/751 |

(Continued)

OTHER PUBLICATIONS

Tech Fowler, "Unboxing The Ring Video Doorbell: Is It Worth It?" (i.e., Vid 0), Published Sep. 7, 2019, available at <https://www.youtube.com/watch?v=nawKCqiE9KY> (Year: 2019).*

*Primary Examiner* — Frank Johnson
(74) *Attorney, Agent, or Firm* — Nolte Lackenbach Siegel

(57) ABSTRACT

Methods, systems, and devices for intruder detection are described. A security and automation system may include a camera configured to monitor a zone of a premises. The security and automation system may detect a person in the zone, for example using the camera, a motion sensor, or another sensor. The security and automation system may determine that the person has remained in the zone for a threshold duration. The security and automation system may generate a notification (e.g. an audiovisual notification) based on determining that the person has remained in the zone for the duration. In some examples, the notification may include a verbal message, a flashing light, etc., to indicate to the person that video recording was initiated. The techniques described herein may inform an intruder that video is being recorded, which may discourage an intruder from an intended action (e.g., theft, property damage, etc.), among other benefits.

20 Claims, 11 Drawing Sheets

(56) References Cited

U.S. PATENT DOCUMENTS

| | | | |
|---|---|---|---|
| 2018/0357871 A1* | 12/2018 | Siminoff | G08B 13/189 |
| 2019/0087646 A1* | 3/2019 | Goulden | G06T 7/70 |
| 2019/0108734 A1* | 4/2019 | Cook | H04N 7/188 |
| 2019/0188487 A1* | 6/2019 | Olsson | G06V 20/52 |
| 2019/0246075 A1* | 8/2019 | Khadloya | H04N 7/183 |
| 2019/0260661 A1* | 8/2019 | Amini | H04W 36/0011 |
| 2019/0327448 A1* | 10/2019 | Fu | G08B 3/10 |
| 2019/0342622 A1* | 11/2019 | Carrigan | H04N 21/8456 |
| 2020/0364991 A1* | 11/2020 | Scalisi | G08B 13/19619 |
| 2022/0223017 A1* | 7/2022 | Wong | H04N 5/23218 |

* cited by examiner

TECHNIQUES FOR INTRUDER DETECTION

BACKGROUND

The present disclosure, for example, relates to security and automation systems, and more particularly to techniques for intruder detection in security and automation systems.

Security and automation systems are widely deployed in a smart environment (e.g., a residential, a commercial, or an industrial setting) to provide various types of communication and functional features such as monitoring, communication, notification, and/or others. These systems may be capable of supporting communication with a person through a communication connection or a system management action.

Present security and automation system may include one or more sensors for monitoring a home or a commercial business. These systems typically employ sensors at entry and exit points, along with interior sensors (e.g., motion detectors, sound sensors, and glass break sensors) for determining entry or exit into or out of a property. Although some techniques related to security may provide for informing a personnel of detected intruders, these techniques may be inefficient and may require additional intervention by the personnel. Specifically, as home automation and security products expand in functionality in a home, opportunities exist for providing improved automated control upon detecting an intruder.

SUMMARY

The described techniques relate to improved methods, systems, devices, and apparatuses that support techniques for intruder detection. Generally, the described techniques provide for enabling a security and automation system to monitor a zone of a premises, for example using a camera. The security and automation system may detect a person in the zone, for example using the camera, a motion sensor, or another sensor. The security and automation system may determine that the person has remained in the zone for a threshold duration. The security and automation system may generate a notification (e.g. an audiovisual notification) based on determining that the person has remained in the zone for the duration. In some examples, the notification may include a verbal message, a flashing light, etc., to indicate to the person that video recording was initiated. The techniques described herein may inform an intruder that video is being recorded, which may discourage an intruder from an intended action (e.g., theft, property damage, etc.), among other benefits.

A method for intruder detection at a security and automation system associated with a premises is described. The method may be performed by a computing device including at least one processor. The method may include monitoring, by a camera of the security and automation system, a zone within a field of view of the camera, detecting a presence of a person in the zone based on the monitoring, determining the person has remained in the zone for a threshold duration after the detecting, and generating, via the security and automation system, an audiovisual notification based on determining the person has remained in the zone for the threshold duration.

An apparatus for intruder detection at a security and automation system associated with a premises is described. The apparatus may include a processor, memory coupled with the processor, and instructions stored in the memory. The instructions may be executable by the processor to cause the apparatus to monitor, by a camera of the security and automation system, a zone within a field of view of the camera, detect a presence of a person in the zone based on the monitoring, determine the person has remained in the zone for a threshold duration after the detecting, and generate, via the security and automation system, an audiovisual notification based on determining the person has remained in the zone for the threshold duration.

A non-transitory computer-readable medium storing code is described. The code may include instructions executable by a processor of a security and automation system to monitor, by a camera of the security and automation system, a zone within a field of view of the camera, detect a presence of a person in the zone based on the monitoring, determine the person has remained in the zone for a threshold duration after the detecting, and generate, via the security and automation system, an audiovisual notification based on determining the person has remained in the zone for the threshold duration.

Some examples of the method, apparatus, and non-transitory computer-readable medium described herein may further include operations, features, means, or instructions for initiating a video recording at the camera based on determining the person may have remained in the zone for the threshold duration, where the audiovisual notification indicates the video recording may have been initiated.

Some examples of the method, apparatus, and non-transitory computer-readable medium described herein may further include operations, features, means, or instructions for determining a second notification based on determining the person may have remained in the zone for the threshold duration, and transmitting the second notification to one or more devices associated with the security and automation system.

Some examples of the method, apparatus, and non-transitory computer-readable medium described herein may further include operations, features, means, or instructions for receiving a response to the second notification, and generating a third audiovisual notification based on receiving the response.

In some examples of the method, apparatus, and non-transitory computer-readable medium described herein, the response includes at least one of a command, a text message, a confirmation message, a verbal message, or any combination thereof, and the third audiovisual notification includes a tone, a spoken announcement, an activation of a light, a flashing pattern of the light, the verbal message, or any combination thereof.

In some examples of the method, apparatus, and non-transitory computer-readable medium described herein, the one or more devices include at least one of a communication interface of the home and automation system, a remote device associated with an occupant of the premises, a device associated with a network operations center, a device associated with an emergency response provider, or any combination thereof.

In some examples of the method, apparatus, and non-transitory computer-readable medium described herein, detecting the presence of the person may include operations, features, means, or instructions for detecting, by a sensor, a motion associated with the person in the zone based on the monitoring, identifying one or more characteristics of the presence based on detecting the motion, and determining the presence corresponds to the person based on identifying the one or more characteristics.

In some examples of the method, apparatus, and non-transitory computer-readable medium described herein, the one or more characteristics include one or more facial features of the person, a profile associated with the person, a gait associated with the detected motion, a speed associated with the detected motion, a direction associated with the detected motion, or any combination thereof.

In some examples of the method, apparatus, and non-transitory computer-readable medium described herein, the camera may be positioned on an exterior surface of a building on the premises. In some examples of the method, apparatus, and non-transitory computer-readable medium described herein, the camera may be located within a housing of a doorbell.

In some examples of the method, apparatus, and non-transitory computer-readable medium described herein, the zone within the field of view of the camera includes a porch, a yard adjacent to the building, a driveway, or any combination thereof.

In some examples of the method, apparatus, and non-transitory computer-readable medium described herein, the audiovisual notification includes a tone, a spoken announcement, an activation of a light, a flashing pattern of the light, or any combination thereof.

In some examples of the method, apparatus, and non-transitory computer-readable medium described herein, the security and automation system includes a camera sensor, a motion sensor, a speaker, a control panel, a transceiver, a doorbell, a light, or any combination thereof.

DETAILED DESCRIPTION

Figure 1:
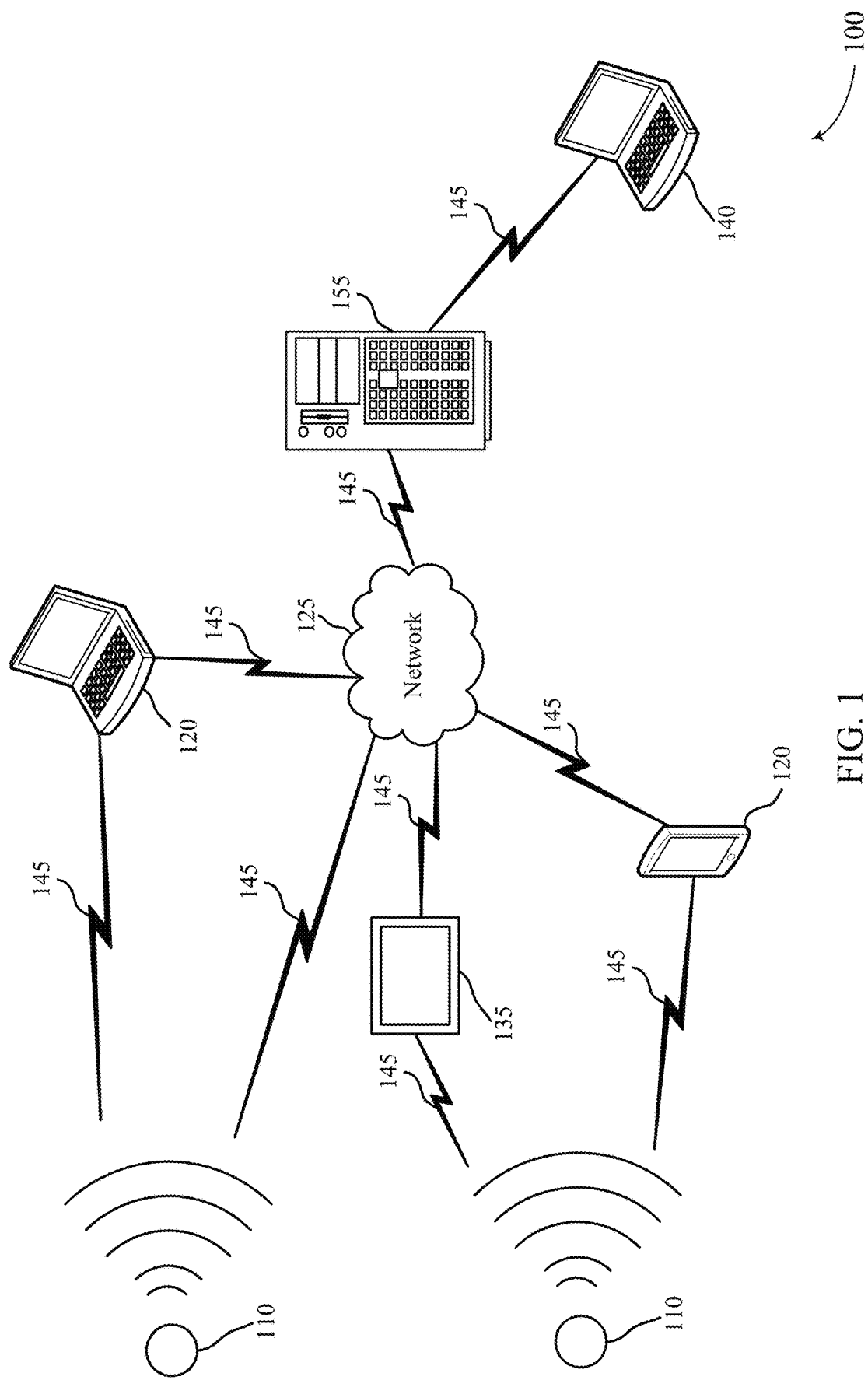
FIG. 1 illustrates an example of a system that supports techniques for intruder detection in accordance with aspects of the present disclosure.

Present security and automation systems, e.g., for homes and commercial businesses, have become commonplace as people seek to guard themselves and their property. These security and automation systems may employ sensors at entry and exit points, along with interior sensors (e.g., motion detectors, sound sensors, and glass break sensors) for determining entry or exit into or out of a property. In addition, these security and automation systems may employ security cameras that perform various operations related to crime or other circumstances. More specifically, the systems and methods described herein relate to controlling access to a home or business based on identifying one or more intruders. The term "home" used throughout this document generically refers to any dwelling or property that is monitored by a monitoring system such as an automation system and/or a security system. An automation system may include automation and security features.

Existing methods for detecting intruders, may have several draw backs, such as for example requiring communication between an occupant and the person seeking to access or intrude a structure. This process may pose a threat to safety when the person seeking access is not properly designated for accessing the premises, and such communication may also be potentially dangerous.

In some cases, sensors of a security and automation system may be configured to monitor a zone of a premises. For example, a camera may be mounted such that the camera may capture images of a driveway, a yard, a porch, etc. The camera may include or be in communication with a motion sensor for detecting movement within the zone. According to some aspects of the present disclosure, the system and methods can be implemented to perform tasks that are responsive to the detected movement. For example, upon detecting movement, the camera may be configured to begin recording video. However, a motion sensor may not be configured to distinguish between a person and movements of other objects (e.g., cars, animals, etc.), which may result in additional video being recorded that may not help identify the intruder. Additionally, it may be beneficial to notify an intruder that video is being recorded, which may prevent the intruder from committing a crime on the premises. The term "security and automation system" may be used herein to describe a security system, an automation system, a smart home security and/or automation system, which may provide automation and/or security functionality.

According to the techniques described herein, a security and automation system may be configured to detect an intruder. The security and automation system may include a camera configured to monitor a zone of a premises. The security and automation system may detect a person in the zone, for example using the camera, a motion sensor, or another sensor. In some examples, the sensors of the security and automation system may be configured to detect a presence of a person at or near a residence. For example, the security and automation system may detect the presence of the person based on detecting and analyzing sounds occurring on or near the residence. In some cases, the security and automation system may detect motion proximate the residence, and may analyze the detected motion to infer that a person is present near the residence. In some embodiments, the security and automation system may determine that a person is within range (e.g., radius) of an access point (e.g., door) based on sensor data received from a sensor unit. For example, a motion sensor may detect motion within range of the access point, and communicate sensor data indicating the detected motion to the control panel. In some examples, the security and automation system may determine that the person has remained in the zone for a duration of time (e.g., a threshold duration, such as twenty seconds, thirty seconds, one minute, etc.), which may indicate the detected person is not passing through the zone (e.g., for a delivery, approaching the premises by accident, etc.).

According to one or more aspects of the present disclosure, the security and automation system may generate a notification (e.g. an audiovisual notification) based on determining that the person has remained in the zone for the duration. In some examples, the security and automation system may detect the person by identifying a presence and determining that the presence is a person rather than another object (e.g., a car, an animal, etc.) based on one or more characteristics of the presence. For example, a sensor of the security and automation system may be configured to recognize a face, a gait, a size, a shape, a speed of motion, etc., which may identify the presence as a person.

In some examples, the security and automation system may configure the camera to initiate video recording based on determining that the person has remained in the zone for the duration. The notification may indicate to the person that video recording was initiated. For example, the notification may include flashing a light at the camera, a verbal announcement at a speaker that video recording was initiated, etc. If an intruder knows that video is being recorded, the intruder may be discouraged from an intended action (e.g., theft, property damage, etc.). In some examples, in addition to notifying the person, the security and automation system may transmit a second notification to a user of the security and automation system (e.g., an owner or resident of the premises) based on determining the person has remained in the zone. The second notification may include a text message, a phone call, a push notification, etc. The user may choose to respond to the notification, for example by instructing the security and automation system to generate an additional notification (e.g., a third notification) for the detected person. Additionally or alternatively, the security and automation system or the user may transmit a notification to a network operations center (e.g., for a provider of the security and automation system), an emergency response provider, etc.

Aspects of the disclosure are initially described in the context of security and automation systems. Aspects of the disclosure are further illustrated by and described with reference to security and automation environments and a process flow. Aspects of the disclosure are further illustrated by and described with reference to apparatus diagrams, system diagrams, and flowcharts that relate to techniques for intruder detection.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 illustrates an example of a system 100 that supports techniques for intruder detection in accordance with aspects of the present disclosure. The system 100 may be an example of a security and automation system. The system 100 may include one or more sensor units 110, one or more local computing devices 120, control panel 135, remote computing device 140, and server 155. The network 125 may provide personal authentication credentials, encryption, access authorization, tracking, Internet Protocol (IP) connectivity, and other access, computation, modification, and/or functions. The control panel 135 may interface with the network 125 through a first set of wired and/or wireless communication links 145 to communicate with the server 155. The control panel 135 may perform communication configuration, adjustment, and/or scheduling for communication with the local computing device 120 and remote computing device 140, or may operate under the control of a controller. Control panel 135 may communicate with a back-end server (such as the server 155)—directly and/or indirectly—using the first set of one or more wireless communication links 145. In some examples, the server 155 may be a remote server located at a location different or same from the control panel 135, the local computing device 120, and/or the remote computing device 140.

The control panel 135 may wirelessly communicate with the remote computing device 140 and the local computing device 120 by way of one or more antennas. The control panel 135 may provide communication coverage for a respective coverage area (e.g., residential, commercial). In some examples, the control panel 135 may be referred to as a control device, a controller, a base transceiver station, a radio base station, an access point, a radio transceiver, or some other suitable terminology. The coverage area for a control panel 135 may be divided into sectors making up only a portion of the coverage area. The security and automation system 100 may include control panels of different types. In some examples, the security and automation system 100 may include overlapping coverage areas for one or more different parameters, including different technologies, features, subscriber preferences, hardware, software, technology, and/or methods.

For example, one or more control panels may be related to one or more discrete structures (e.g., a house, a business) and each of the one more discrete structures may be related to one or more discrete areas (e.g., multiple houses in a neighborhood). In other examples, multiple control panels may be related to the same one or more discrete structures (e.g., multiple control panels relating to a house and/or a business complex). For example, one or more control panels may be located within a house. Additionally or alternatively, each room within the house may have a designated control panel located within each room. In some cases, the one or more control panels may communicate with one another via one or more communication protocols. In some examples, the one or more control panels may form a mesh network within the house and communicate with one another via the mesh network. In some examples, a control panel may modify or update a security parameter based on information received from one or more other control panels in the mesh network.

The local computing device 120 or remote computing device 140 may be dispersed throughout the security and automation system 100. In some examples, the local computing device 120 and/or remote computing device 140 may be stationary and/or mobile. In some examples, the local computing device 120 and/or remote computing device 140 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors), a printer, a camera, and/or the like. The local computing device 120 and/or remote computing device 140 may, additionally or alternatively, include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

In some examples, control panel 135 may be a smart home system panel, for example, an interactive panel mounted on a wall or other surface in a person's home. Control panel 135 may be in direct communication via wired or wireless communication links 145 with the one or more sensor units 110, or may receive sensor data from the one or more sensor units 110 via local computing device 120 and network 125, or may receive data via remote computing device 140, server 155, and network 125. Additionally or alternatively, the control panel 135 may wirelessly communicate with the sensor units 110 via one or more antennas. The sensor units 110 may be dispersed throughout the security and automation system 100 and each sensor unit 110 may be stationary and/or mobile. Sensor units 110 may include and/or be one or more sensors that sense: proximity, motion, temperatures, humidity, sound level, smoke, structural features (e.g., glass breaking, window position, door position), time, light, geo-location data of a person and/or a device, distance, biometrics, weight, speed, height, size, preferences, light, darkness, weather, time, system performance, and/or other inputs that relate to a security and/or an automation system.

The local computing device 120, remote computing device 140, and/or a sensor units 110 may be able to communicate through one or more wired and/or wireless connections with various components such as a control panel, base stations, and/or network equipment (e.g., servers, wireless communication points) and/or the like. In some examples, one or more sensor units 110 may be located within a structure, e.g., house. Additionally or alternatively, in some examples, the structure may have a designated sensor unit located within one or more predetermined areas, e.g., rooms. In some cases, the one or more sensor units 110 may communicate with one another via one or more communication protocols. In some examples, the one or more sensor units 110 may form a mesh network within the structure and communicate with one another via the mesh network. In some examples, the mesh network associated with the sensor units 110 may be different or be a part of a mesh network associated with one or more control panels.

The wireless communication links 145 shown in the security and automation system 100 may include uplink (UL) transmissions from a local computing device 120 to a control panel 135, and/or downlink (DL) transmissions, from a control panel 135 to the local computing device 120. The downlink transmissions may also be called forward link transmissions while the uplink transmissions may also be called reverse link transmissions. Wireless communication links 145 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels), overhead information, user data, etc. The wireless communication links 145 may transmit bidirectional communications and/or unidirectional communications. Wireless communication links 145 may include one or more connections, including but not limited to, 345 MHz, Wi-Fi, BLUETOOTH®, BLUETOOTH® Low Energy, cellular, Z-WAVE®, 802.11, peer-to-peer, LAN, wireless local area network (WLAN), Ethernet, FireWire®, fiber optic, and/or other connection types related to security and/or automation systems.

In some examples, of the security and automation system 100, control panel 135, local computing device 120, and/or remote computing device 140 may include one or more antennas for employing antenna diversity schemes to improve communication quality and reliability between control panel 135, local computing device 120, and remote computing device 140. Additionally or alternatively, control panel 135, local computing device 120, and/or remote computing device 140 may employ multiple-input, multiple-output (MIMO) techniques that may take advantage of multi-path, mesh-type environments to transmit multiple spatial layers carrying the same or different coded data.

While the local computing device 120 and/or remote computing device 140 may communicate with each other through the control panel 135 using wireless communication links 145, the local computing device 120 and/or remote computing device 140 may also communicate directly with one or more other devices via one or more direct communication links (not shown). Examples of direct communication links may include Wi-Fi Direct, BLUETOOTH®, wired, and/or, and other P2P group connections. The control panel 135, local computing device 120, and/or remote computing device 140 in these examples may communicate according to the WLAN radio and baseband protocol including physical and medium access control (MAC) layers from Institute of Electrical and Electronics Engineers (IEEE) 802.11, and its various versions including, but not limited to, 802.11b, 802.11g. 802.11a. 802.11n, 802.11ac, 802.11ad, 802.11ah, etc. In other implementations, other peer-to-peer connections and/or ad hoc networks may be implemented within security and automation system 100.

In an example, local computing device 120 and remote computing device 140 may be custom computing entities configured to interact with sensor units 110 via network 125, and in some examples, via server 155. In other examples, local computing device 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®; an iPad®, a smart phone, a mobile phone, a personal digital assistant (PDA), and/or any other suitable device operable to send and receive signals, store and retrieve data, and/or execute modules. The local computing device 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some examples, the local computing device 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing device 120 may be operable to control operation of the output of the local computing device 120. The output may be a television, a liquid crystal display (LCD) monitor, a cathode ray tube (CRT) monitor, speaker, tactile output device, and/or the like. In some examples, the output may be an integral component of the local computing device 120. Similarly, the output may be directly coupled with the processor. For example, the output may be the integral display of a tablet and/or smart phone. In some examples, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing device 120 to the output.

The remote computing device 140 may be a computing entity operable to enable a remote person to monitor the output of the sensor units 110. The remote computing device 140 may be functionally and/or structurally similar to the local computing device 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 155.

In some examples, the sensor units 110 may be sensors configured to conduct periodic or ongoing automatic measurements related to detecting an occurrence of an event. In some examples, the sensor units 110 may be configured to determine presence, occupancy, identity, and location based on a received request. Each sensor unit 110 may be capable of sensing multiple identification and/or location determining parameters, or alternatively, separate sensor units 110 may monitor separate identification and/or location determining parameters. For example, one sensor unit 110 may determine an identity of a person, while another sensor unit 110 (or, in some examples, the same sensor unit 110) may detect an occupancy of and/or location of the person.

In some examples, the sensor units 110 may be separate from the control panel 135 and may be positioned at various locations throughout the house or the property. In other examples, the sensor units 110 may be integrated or collocated with other house and/or building automation system components, home appliances, and/or other building fixtures. For example, a sensor unit 110 may be integrated with a doorbell or door intercom system, or may be integrated with a front entrance light fixture. In other examples, a sensor unit 110 may be integrated with a wall outlet and/or switch. In other examples, the sensor units 110 may be integrated and/or collocated with the control panel 135 itself. In some examples, each of the sensor units 110, control panel 135, and/or local computing device 120 may include a speaker unit, a microphone unit, and/or a camera unit, among other things.

In some cases, a property may be monitored by the control panel 135 and/or sensor units 110. In some examples, the control panel 135 may include sensor units 110 such that the control panel 135 may directly receive signals (e.g., motion sensed, entry/exit detected) associated with the property. Each sensor unit 110 may be capable of sensing multiple occupancy parameters, or alternatively, separate sensor units may monitor separate occupancy parameters. For example, one sensor unit may be a motion sensor, while another sensor unit may detect security parameters by monitoring vibration or audio. In some cases, sensor units 110 may additionally monitor alternate security and occupancy parameters, for example by monitoring heartbeat or breathing. In some examples, occupancy may be detected by any one of a motion sensor, audio sensor, radio frequency identification (RFID) sensor, video camera, light-break sensor, or a combination thereof. In some examples, the sensor units 110 may be separate from the control panel 135, and may be positioned at various locations, also referred to herein as zones, throughout a property. In other examples, the sensor units 110 may be integrated or collocated with other security and automation system components. For example, a sensor unit 110 may be integrated with a wall, door, window for detecting entry and/or exit of a person relative to the property. In other examples, the sensor units 110 may be integrated or collocated with the control panel 135 itself.

In some cases, the control panel 135 in communication with the sensor units 110 may receive sensor data associated with at least one sensor of a home automation system. In some examples, the control panel 135 may receive a trigger to perform a security function associated with a home automation system. In some examples, the security function may be instructions to arm or disarm a property (i.e., activate alarm parameters). After receiving the instructions, the control panel 135 may determine one or more settings associated with the security and automation system 100. In some examples, the security and/or automation system 100 may be referred to as a home automation system.

In some examples, a sensor unit 110 may include a camera configured to monitor a zone of a premises. In some cases, the camera may be configured to monitor a zone within a field of view of the camera. In one example, a user of the system 100 may initiate a mode which includes the monitoring (such as an "away" mode). The system 100 may detect a person in the zone, for example using the camera or another sensor unit 110 (e.g., a motion sensor). The system 100 may determine that the person has remained in the zone for a threshold duration. The system 100 may generate a notification (e.g. an audiovisual notification) based on determining that the person has remained in the zone for the threshold duration. In some examples, the notification may include a verbal message, a flashing light, or both, to indicate to the person that video recording was initiated. The system 100 may provide the notification via a speaker or a light of a sensor unit 110. The techniques described herein may inform an intruder that video is being recorded, which may discourage an intruder from an intended action (e.g., theft, property damage, etc.), among other benefits.

Figure 2:
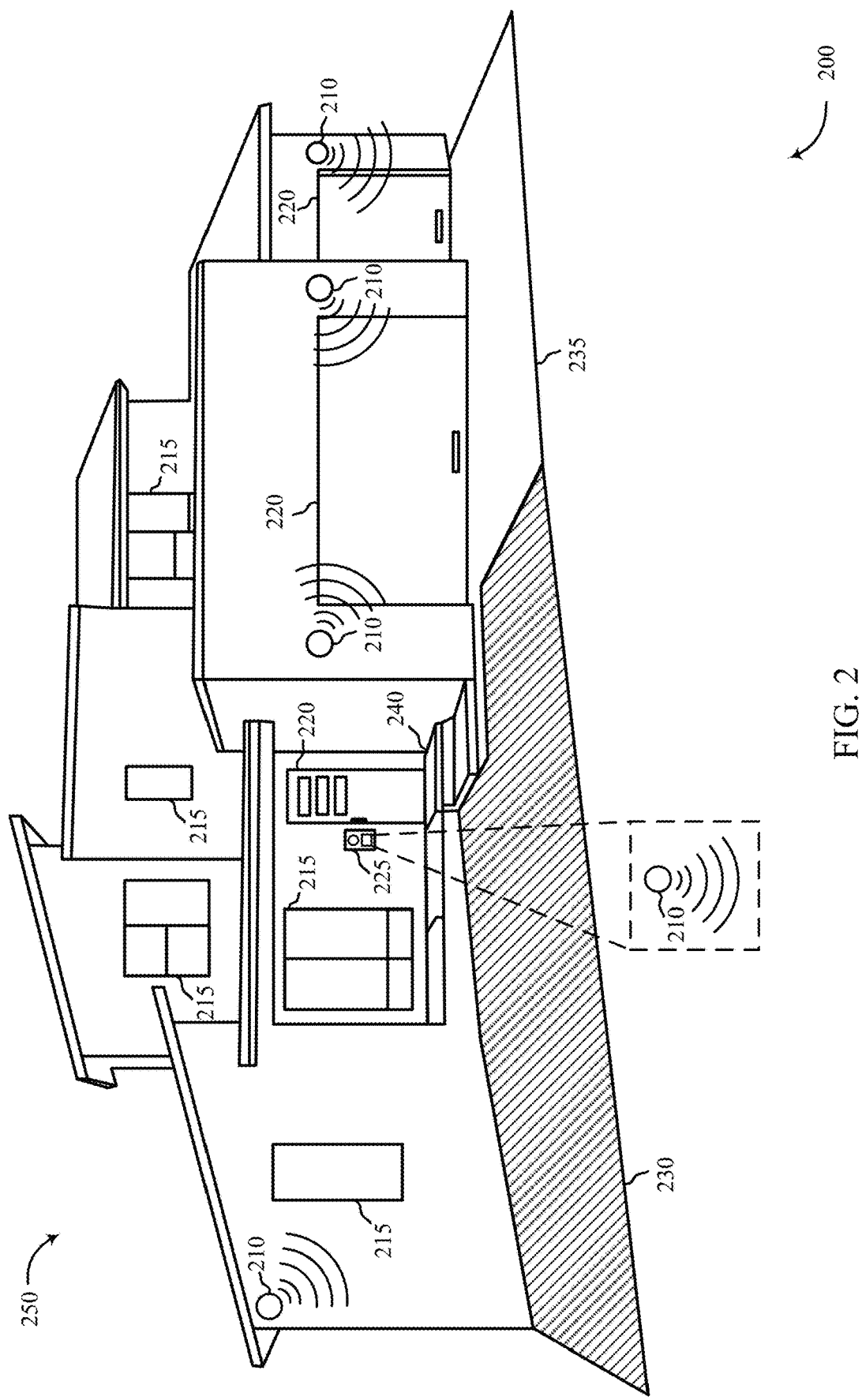
FIG. 2 illustrates an example of a security and automation environment that supports techniques for intruder detection in accordance with aspects of the present disclosure.

FIG. 2 illustrates an example of a security and automation environment 200 that supports techniques for intruder detection in accordance with aspects of the present disclosure. In some examples, security and automation environment 200 may implement aspects of the system 100. The security and automation environment 200 may include one or more sensor units 210 and one or more access points 215 and one or more access points 220. For example, the access points 215 may include windows of a home 250, and the access points 220 may include doors (e.g., an entrance door, a garage door, etc.) to a home 250. In some examples, the home 250 may include a porch 240.

One or more sensor units 210 may include one or more examples of sensor units 110 as described in FIG. 1. The one or more sensor units 210 may be installed, mounted, or integrated with one or more of the access points 215 and the access points 220, or alternatively with an interior and/or an exterior surface of the home 250. In some examples, one or more sensor units 210 may be installed, mounted, or integrated with a doorbell 225. The one or more sensor units 210 may monitor an exterior or an interior of the home 250. In some examples, the one or more sensor units 210 may monitor a yard 230 and/or a driveway 235 adjacent to the home 250.

The home 250 may include one or more zones. In one example, a zone of the home 250 may be a bedroom, living room, etc., of the home 250. The zone may also include a floor and a ceiling. In some examples, the zone may include one or more sensors units 210 (not shown) or devices installed, mounted, or integrated with the zone 205. For example, the zone may have a motion sensor (such as sensor 210) installed or mounted on a wall of the zone. The motion sensor may detect whether the zone is occupied and report collected sensor data to a control panel. In some examples, the zone may include an access point 215 and an access point 220. The access point 220 may include a door or be an open entry. Additionally or alternatively, the access point 215 may include a window. In some examples, the zone may include a lock component. For instance, the access point 220 may include a lock component, while the access point 215 may be absent of a lock component, e.g., when the access point 220 is an open entry-way.

The home 250 may include a security and automation system (e.g., the system 100) configured to detect intruders, among other benefits. Although not depicted herein, the home 250 may include a control panel, which may be one or more examples of a control panel 135 as described in FIG. 1. The control panel may be a smart home system panel, for example, an interactive panel mounted on a wall of the security and automation environment 200. In some examples, the control panel may be in direct communication via wired or wireless communication links with one or more sensor units 210, may receive sensor data from the one or more sensor units 210. In some examples, the control panel 135 may communicate and receive data periodically or continuously from the sensor units 210. The control panel and the one or more sensor units 210 may communicate according to a radio access technology (RAT) such as 5G New Radio (NR) RAT, Long Term Evolution (LTE), IEEE 802.11 (Wi-Fi), IEEE 802.16 (WiMAX), near-field communication (NFC), ZigBee protocol, among others.

One or more of the sensor units 210 may include cameras configured to detect an intruder. For example, a user of the security and automation system may initiate a mode (e.g., an "away" mode) which includes an increased sensitivity for detecting individuals in the security and automation environment 200. Each camera may monitor a zone of the security and automation environment 200. Each monitored zone may be within a field of view of the associated camera. For example, a sensor unit 210 installed, mounted, or integrated with the doorbell 225 may be configured to monitor a zone including the porch 240. Additionally or alternatively, one or more sensor units 210 may monitor zones of the security and automation environment 200 which may include at least a portion of the yard 230, at least a portion of the driveway 235, or a combination thereof. In some examples, the zones monitored by the sensor units 210 may overlap (e.g., to avoid blind spots or unmonitored areas in the security and automation environment 200).

One or more sensor units 210 may detect a presence in a monitored zone. For example, a camera or a motion sensor may detect movement within the zone. In one example, the one or more sensor units 210 may determine a person within a range of an access point. The sensor units 210 may be configured to determine whether the presence is a person or another object (e.g., a vehicle) or an animal based on one or more characteristics of the presence. For example, one or more sensor units 210 may be configured to recognize a face, a gait, a size, a shape, a speed of motion, etc., which may identify the presence as a person. Additionally or alternatively, the security and automation environment 200 may determine a person within a range of an access point based on sensor data received from one or more sensor units 210. Based on determining that the person is within the range of the access point, a control panel may detect or otherwise identify the person.

According to one or more aspects of the present disclosure, after the presence of the person is detected in the zone, the one or more sensor units 210 may determine whether the person remains in the zone for a threshold duration (e.g., twenty seconds). If the person does not remain in the zone for the threshold duration, the security and automation system may take no further action. For example, the person may be delivering a package or approach the home 250 by accident, and the person may leave the zone without remaining for the threshold duration. If the person remains in the zone for the threshold duration, the security and automation system may determine to initiate a video recording of the zone including the detected person. In some examples, if the person commits a crime at the security and automation environment 200 (e.g., property theft, property damage, etc.), the recorded video may be used to identify the person. The recorded video may be stored in memory associated with the security and automation system. The memory may include a local hard drive, a remote hard drive, a cloud storage, a database of a server, or any combination thereof.

The security and automation system may further determine to notify the person that video recording was initiated. Accordingly, the security and automation system may generate a notification (e.g., an audiovisual notification) based on determining that the person has remained in the zone for the threshold duration. If the person knows video is being recorded, the person may be discouraged from an intended action (e.g., committing a crime). In some examples, the notification may include flashing a light at a sensor unit 210 (e.g., the camera), a verbal announcement at a sensor unit 210 (e.g., a sensor unit 210 that includes a speaker) that video recording was initiated, etc. In some examples, the security and automation system may generate the notification to comply with local laws associated with video recording.

In some examples, in addition to notifying the person, the security and automation system may transmit a second notification to the user of the security and automation system (e.g., an owner or resident of the home 250) based on determining the person has remained in the zone. The second notification may include a text message, a phone call, a push notification, etc. The user may choose to respond to the second notification, for example by instructing the security and automation system to generate an additional notification (e.g., a third notification) for the detected person. Additionally or alternatively, the security and automation system or the user may transmit a notification to a network operations center (e.g., for a provider of the security and automation system), an emergency response provider, etc. In one example, the security and automation system may choose to transmit the second notification upon determining that the user of the security and automation system is away from the home. For instance, the security and automation system may determine when a person has exited a home. For example, a control panel and/or one or more of the locks within the home 250 may receive sensor data from one or more of the sensor units 210 dispersed throughout the home 250.

Each sensor unit 210 may be capable of sensing multiple occupancy parameters, or alternatively, separate sensor units 210 may monitor separate occupancy parameters. For example, one sensor unit 210) may be a motion sensor, while another sensor unit 210 may detect security parameters by monitoring vibration or audio. In some cases, sensor units 210 may additionally monitor alternate security and occupancy parameters, for example by monitoring heartbeat or breathing. In some examples, occupancy may be detected by any one of a motion sensor, audio sensor, RFID sensor, video camera, light-break sensor, or a combination thereof. Upon detecting that the home 250 is occupied, the security and automation system may wait for an input from the user of the home prior to notifying the intruder. Alternatively, upon detecting that the home 250) is not occupied, the security and automation system may automatically notify the intruder without receiving any input from the user of the security and automation system (e.g., owner of the home 250). The techniques described herein may improve a likelihood that a security and automation system may prevent theft of or damage to property in the security and automation environment 200, among other benefits.

Figure 3:
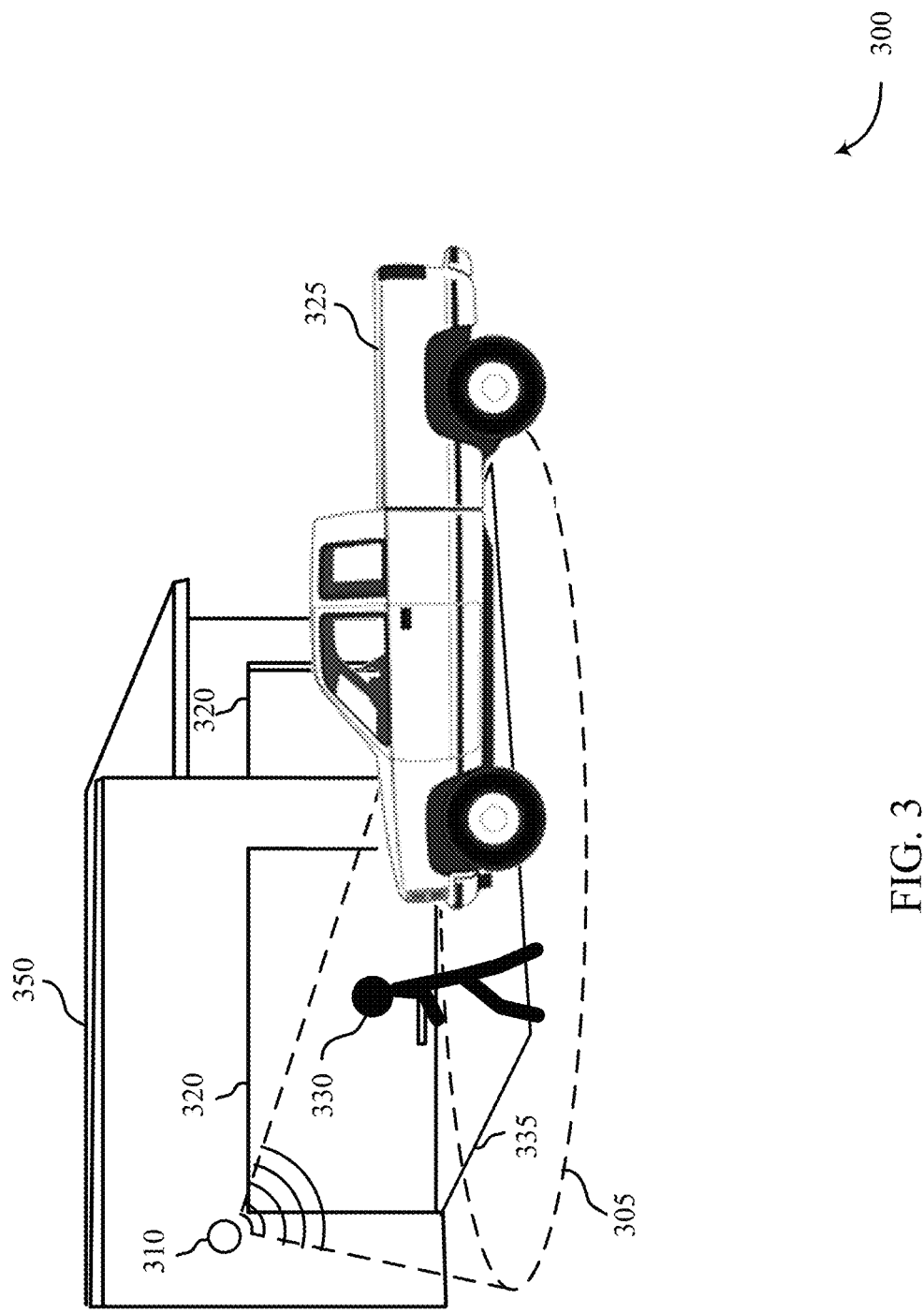
FIG. 3 illustrates an example of a security and automation environment that supports techniques for intruder detection in accordance with aspects of the present disclosure.

FIG. 3 illustrates an example of a security and automation environment 300 that supports techniques for intruder detection in accordance with aspects of the present disclosure. In some examples, security and automation environment 300 may implement aspects of the system 100. The security and automation environment 300 may include a sensor unit 310 and one or more access points 320. For example, the access points 320 may include doors (e.g., an entrance door, a garage door, etc.) of a building 350) (e.g., a home, a commercial business, etc.). The sensor unit 310 may be installed, mounted, or integrated with one or more of the access points 320, or alternatively with an exterior surface of the building 350. The sensor unit 310 may monitor an exterior of the home 350. In some examples, the sensor unit 310 may monitor a driveway 335 adjacent to the building 350 (or home 350). The security and automation environment 300 may include a security and automation system (e.g., the system 100) configured to detect intruders, among other benefits. In some examples, the security and automation system may include the sensor unit 310.

The sensor unit 310 may include a camera configured to detect an intruder. For example, a user of the security and automation system may initiate a mode (e.g., an "away" mode) which includes an increased sensitivity for detecting individuals in the security and automation environment 300. In some examples, the security and automation system may initiate a mode (e.g., an "away" mode) including an increased sensitivity for detecting individuals in the security and automation environment 300 based on an occupancy of the home 350. For instance, the security and automation system in communication with one or more sensor units 310 may detect a person exiting the home 350. In some examples, a control panel may detect that a person has exited the home 350 based on received sensor data associated with an entry/exit access point. The control panel may then parse sensor data from one or more other sensors 310 located at the structure to determine whether an occupancy can be detected (e.g., another person within the home 350). If the control panel determines that no occupancy is present, the control panel may cause the security and automation system to initiate the "away" mode.

In some examples, the one or more sensor units 310 may include a camera configured to monitor a zone 305 of the security and automation environment 300. The zone 305 may be within a field of view of the camera. In some examples, the security and automation environment 300 may include additional sensor units 310 (not shown), which may monitor additional zones 305 (not shown) to detect intruders. In some examples, the zones 305 monitored by the sensor units 310 may overlap (e.g., to avoid blind spots or unmonitored areas in the security and automation environment 300).

The sensor unit 310 may detect a presence of one or more objects in the zone 305. For example, the camera or a motion sensor of the sensor unit 310 may detect movement within the zone 305. For example, the sensor unit 310 may detect a vehicle 325 and a person 330 in the zone 305. In some examples, the sensor unit 310 may be in contact with an access point, the sensor unit 310 may be in contact with a doorbell camera, the sensor unit 310 may be associated with an exterior of the home 350, the sensor unit 310 may be within the home 350, the sensor unit 310 may be a camera, the sensor unit 310 may be a motion sensor, the sensor unit 310 may be a control panel, or a combination thereof. The sensor unit 310 may be configured to distinguish between the vehicle 325 and the person 330 based on one or more characteristics of the detected objects. For example, the sensor unit 310 may be configured to recognize a face, a gait, a size, a shape, a speed of motion, etc., which may identify the person 330. Additionally or alternatively, the sensor unit 310 may identify one or more characteristics of the vehicle 325 (or another animate or inanimate object) and determine the vehicle 325 is not a human.

After the presence of the person 330 is detected in the zone 305, the sensor unit 310 may determine whether the person 330 remains in the zone 305 for a threshold duration. If the person 330 does not remain in the zone 305 for the threshold duration, the security and automation system may take no further action. If the person 330 remains in the zone 305 for the threshold duration, the security and automation system may determine to initiate video recording of the zone 305, including the detected person 330. The security and automation system may further determine to notify the person 330 that video recording was initiated. Accordingly, the security and automation system may generate a notification (e.g., an audiovisual notification) based on determining that the person 330 has remained in the zone 305 for the threshold duration. In some examples, the notification may include activating or flashing a light at the sensor unit 310, a tone or a verbal announcement at a speaker of the sensor unit 310 indicating that video recording was initiated, etc. For instance, the notification may include activating one or more light-emitting diode (LED) lights at the sensor unit 310. The LED lights may be colored or non-colored. In some examples, the audible indication may include broadcasting of the audible indication based on a proximity of the person to the home 350.

In some examples, based on receiving (e.g., hearing or seeing) the notification, the person 330 may leave the zone 305. For example, the person 330 may leave in a vehicle (e.g., the vehicle 325), move to a street or sidewalk near the security and automation environment 300, enter another building near the security and automation environment 300, or otherwise leave the field of view of the sensor unit 310. The security and automation system may determine that the person 330 has left the zone 305 (e.g., based on information from the sensor unit 310) and determine to stop video recording. In some examples, the security and automation system may store the recorded video for review by the user of the security and automation system.

In some examples, in addition to notifying the person 330, the security and automation system may transmit a second notification to the user of the security and automation system (e.g., an owner or resident of the building 350) based on determining the person 330 has remained in the zone 305. The second notification may include a text message, a phone call, a push notification, etc. The user may choose to respond to the second notification, for example by instructing the security and automation system to generate an additional notification (e.g., a third notification) for the detected person 330. Additionally or alternatively, the security and automation system or the user may transmit a notification to a network operations center (e.g., for a provider of the security and automation system), an emergency response provider, etc. Thus, the techniques described herein may improve a likelihood that a security and automation system may prevent theft of or damage to property in the security and automation environment 300, among other benefits.

Figure 4:
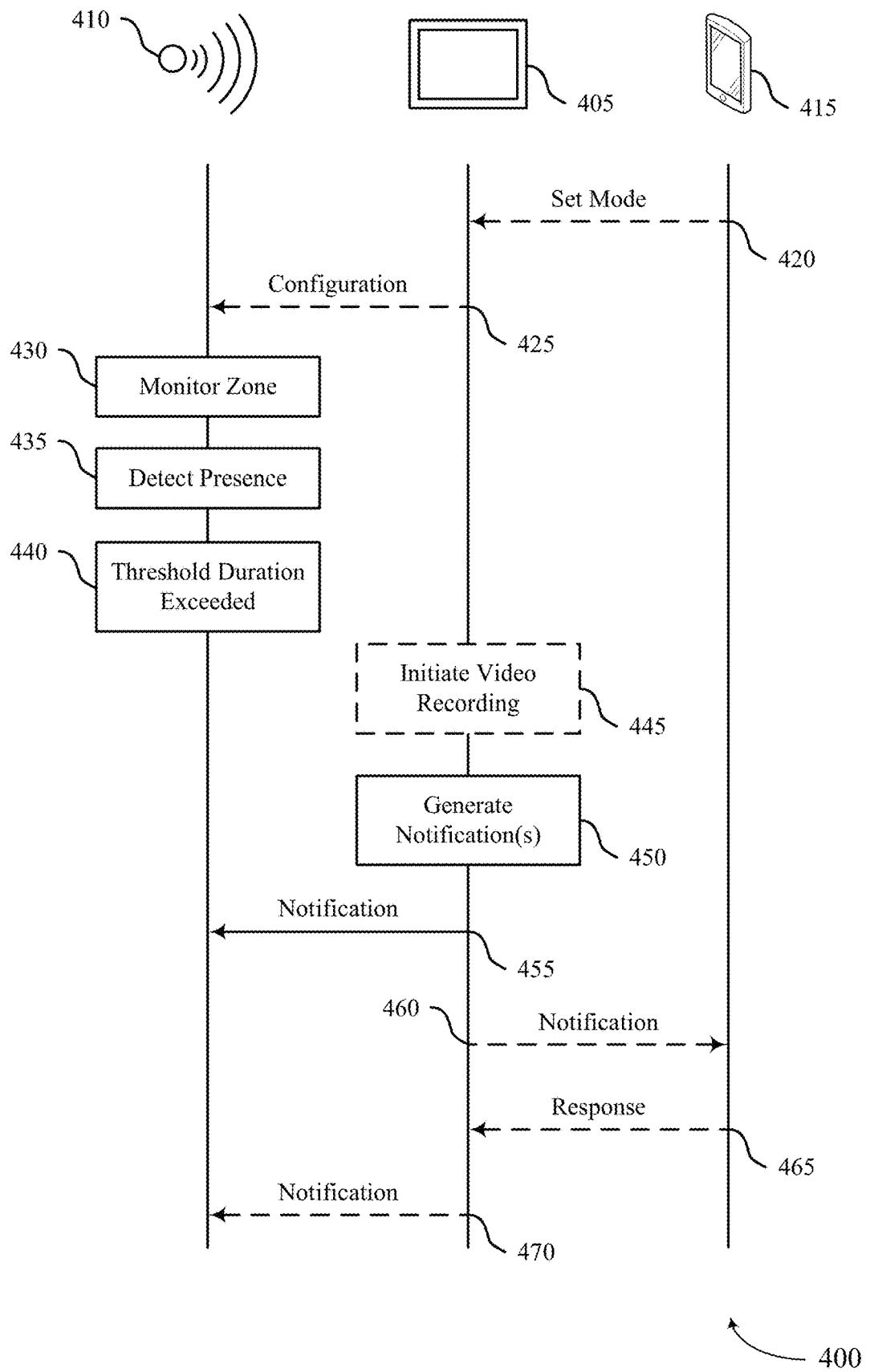
FIG. 4 illustrates an example of a process flow that supports techniques for intruder detection in accordance with aspects of the present disclosure.

FIG. 4 illustrates an example of a process flow 400 that supports techniques for intruder detection in accordance with aspects of the present disclosure. In some examples, process flow 400 may implement aspects of the system 100. For example, the process flow 400 may include example operations associated with one or more of a control panel 405, an sensor unit 410, or a device 415, which may be examples of the corresponding devices described with reference to FIG. 1.

In the following description of the process flow: 400, the operations between the control panel 405, the sensor unit 410, and the device 415 may be performed in a different order than the example order shown, or the operations performed by the control panel 405, the sensor unit 410, and the device 415 may be performed in different orders or at different times. Some operations may also be omitted from the process flow 400, and other operations may be added to the process flow 400. In some examples, one or more operations of the process flow 400 performed by the control panel 405 may additionally or alternatively be performed by a local computing device 120, a server 155, or a remote computing device 140 as described herein. The operations performed by the control panel 405, the sensor unit 410, and the device 415 may support improvements to intruder detection techniques, among other benefits.

In some examples, at 420 the device 415 may optionally transmit a signal to set a mode of a security and automation system. For example, a user associated with the device 415 may initiate a mode (e.g., an "away" mode) which includes an increased sensitivity for detecting individuals in the security and automation system. The device 415 may transmit an indication of the mode to the control panel 405. In some examples, at 425 the control panel 405 may optionally transmit a configuration to the sensor unit 410 based on the set mode. The configuration may include a setting to active a camera at the sensor unit 410 for detecting an intruder.

At 430, the sensor unit 410 may monitor a zone of a premises associated with the security and automation system. The zone may be within a field of view of the camera of the sensor unit 410. The zone may include an exterior of a building on the premises, and may include a porch, a yard, a driveway, or any combination thereof. In some examples, the zone of the premises may include an area within a threshold distance from a building within the premises. In some examples, the zone monitored by the sensor unit 410 may overlap with one or more additional zones monitored by additional sensor units 410 (not shown).

At 435, the sensor unit 410 may detect a presence of one or more objects (e.g., a person, a vehicle, an animal, etc.) in the monitored zone. For example, the camera or a motion sensor of the sensor unit 410 may detect movement within the zone. The sensor unit 410 may be configured to distinguish between a person and other objects based on one or more characteristics of the detected objects. For example, the sensor unit 410 may be configured to recognize a face, a gait, a size, a shape, a speed of motion, etc., which may identify the person. Additionally or alternatively, the sensor unit 410 may identify one or more characteristics of another animate or inanimate object and determine the other object is not a human.

At 440, the sensor unit 410 may determine whether the person remains in the zone for a threshold duration after the presence of the person is detected. In some examples, the threshold duration may be twenty seconds, one minute, or another duration. In some examples, the threshold duration may be based on the mode set by the device 415. For example, the user may select the threshold duration for the mode, such as from a list of options. In another example, the user may input the threshold duration as part of one or more preferences inputted by the user.

If the person does not remain in the zone for the threshold duration, the security and automation system may take no further action. For example, the person may be delivering a package or enter the premises by accident, and the person may leave the zone without remaining for the threshold duration. If the person remains in the zone for the threshold duration, the sensor unit 410 may notify the control panel 405. In some examples, the control panel 405 may identify the person as an intruder on the premises based on the person remaining in the zone for the threshold duration.

In some examples, at 445 the control panel 405 may optionally determine to initiate video recording of the zone, including the detected person. If the person commits a crime at the premises (e.g., property theft, property damage, etc.), the recorded video may be used to identify the person. The recorded video may be stored in memory associated with the security and automation system.

At 450, the control panel 405 may generate one or more notifications based on determining the person has remained in the zone for the threshold duration and/or based on initiating the video recording. For example, the control panel 405 may generate a first notification (e.g., an audiovisual notification) for the person in the zone. The notification may inform the person that the person is trespassing and/or that video recording of the person was initiated. In some examples, the control panel 405 may generate the notification to comply with local laws associated with video recording of individuals. In some examples, the control panel may generate a second notification for the device 415 associated with the user of the security and automation system. The second notification may inform the user that a person has been detected and identified as an intruder.

At 455, the control panel 405 may transmit the first notification to the sensor unit 410 for delivery to the person in the zone. In some examples, the first notification may include activating or flashing a light at the sensor unit 410, broadcasting a tone or a verbal announcement at a speaker of the sensor unit 410, etc. In some examples, at 460 the control panel 405 may transmit the second notification to the device 415. The second notification may include a text message, a phone call, a push notification, etc. Additionally or alternatively, the second notification may be transmitted to a network operations center (e.g., for a provider of the security and automation system), an emergency response provider, etc.

In some examples, at 465 the control panel 405 may receive a response from the device 415. The response may include instructions for the control panel 405 to generate a third notification for the person in the zone. In some examples, the response may include instructions to notify police personnel or the network operation center. In some examples, the response may indicate that the person is recognized. For example, the person may be a neighbor or a friend. The response may also indicate whether the sensor unit 410 is to continue recording video of the person. In some examples, the response from the device 415 may include a request to initiate two-way communication between the device 415 and the sensor unit 410. For example, the sensor unit 410 and the device 415 may each include a speaker and a microphone, and the two-way communication may include audio transmissions between the device 415 and the sensor unit 410.

In some examples, at 470 the control panel 405 may transmit the third notification to the sensor unit 410 based on the response from the device 415. The third notification may include an audiovisual notification, such as a recorded message for the person in the zone. In some examples, the third notification may initiate the two-way communication between the sensor unit 410 and the device 415.

The operations performed by the sensor unit 410, the control panel 405, and the device 415 may improve a likelihood that a security and automation system may prevent theft of or damage to property at the premises, among other benefits.

Figure 5:
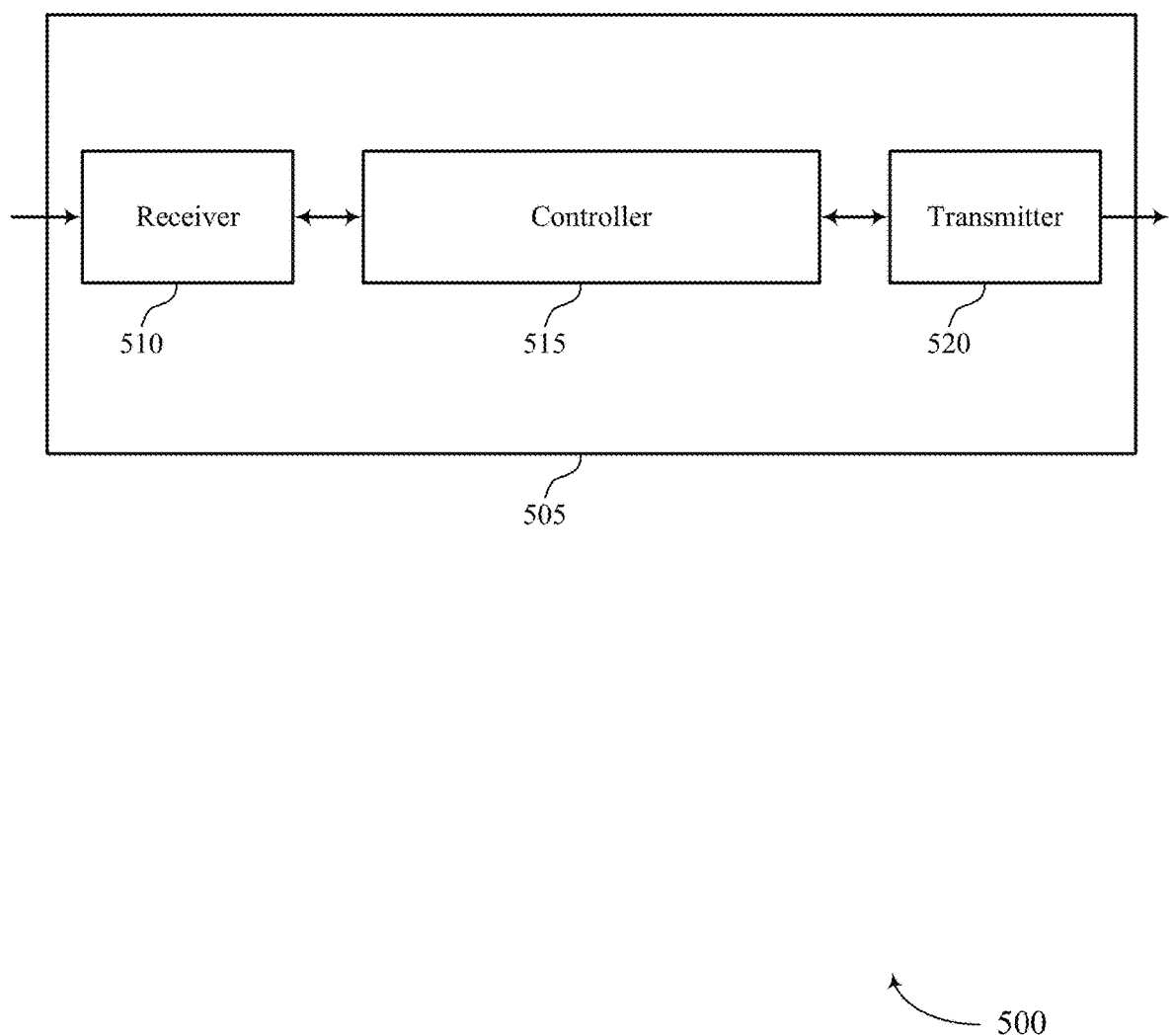
FIGS. 5 and 6 show block diagrams of devices that support techniques for intruder detection in accordance with aspects of the present disclosure.

FIG. 5 shows a block diagram 500 of a device 505 that supports techniques for intruder detection in accordance with aspects of the present disclosure. The device 505 may be an example of aspects of a control panel 135, a local computing device 120, a server 155, or a remote computing device 140 as described herein. The device 505 may include a receiver 510, a controller 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for intruder detection, etc.). Information may be passed on to other components of the device 505. The receiver 510 may be an example of aspects of the transceiver 820 described with reference to FIG. 8. The receiver 510 may utilize a single antenna or a set of antennas.

The controller 515 may monitor, by a camera of the security and automation system, a zone within a field of view of the camera, detect a presence of a person in the zone based on the monitoring, determine the person has remained in the zone for a threshold duration after the detecting, and generate, via the security and automation system, an audiovisual notification based on determining the person has remained in the zone for the threshold duration. The controller 515 may be an example of aspects of the controller 810 described herein.

The controller 515, or its sub-components, may be implemented in hardware, code (e.g., software or firmware) executed by a processor, or any combination thereof. If implemented in code executed by a processor, the functions of the controller 515, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The controller 515, or its sub-components, may be physically located at various positions, including being distributed such that portions of functions are implemented at different physical locations by one or more physical components. In some examples, the controller 515, or its sub-components, may be a separate and distinct component in accordance with various aspects of the present disclosure. In some examples, the controller 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
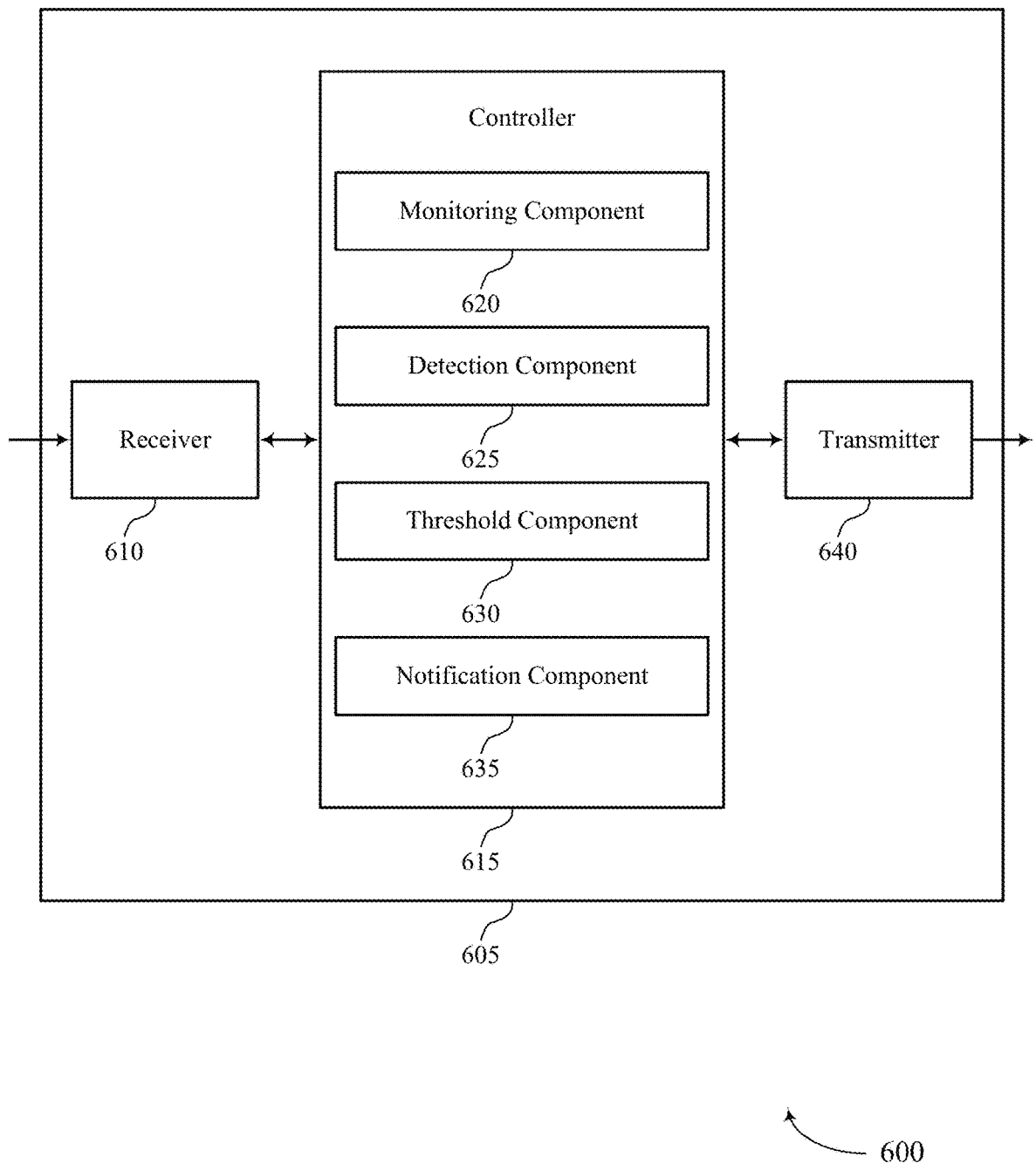

FIG. 6 shows a block diagram 600 of a device 605 that supports techniques for intruder detection in accordance with aspects of the present disclosure. The device 605 may be an example of aspects of a device 505 a control panel 135, a local computing device 115, 120, a server 155, or a remote computing device 140 as described herein. The device 605 may include a receiver 610, a controller 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to techniques for intruder detection, etc.). Information may be passed on to other components of the device 605. The receiver 610 may be an example of aspects of the transceiver 820 described with reference to FIG. 8. The receiver 610 may utilize a single antenna or a set of antennas.

The controller 615 may be an example of aspects of the controller 515 as described herein. The controller 615 may include a monitoring component 620, a detection component 625, a threshold component 630, and a notification component 635. The controller 615 may be an example of aspects of the controller 810 described herein.

The monitoring component 620 may monitor, by a camera of the security and automation system, a zone within a field of view of the camera. The detection component 625 may detect a presence of a person in the zone based on the monitoring. The threshold component 630 may determine the person has remained in the zone for a threshold duration after the detecting. The notification component 635 may generate, via the security and automation system, an audiovisual notification based on determining the person has remained in the zone for the threshold duration.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
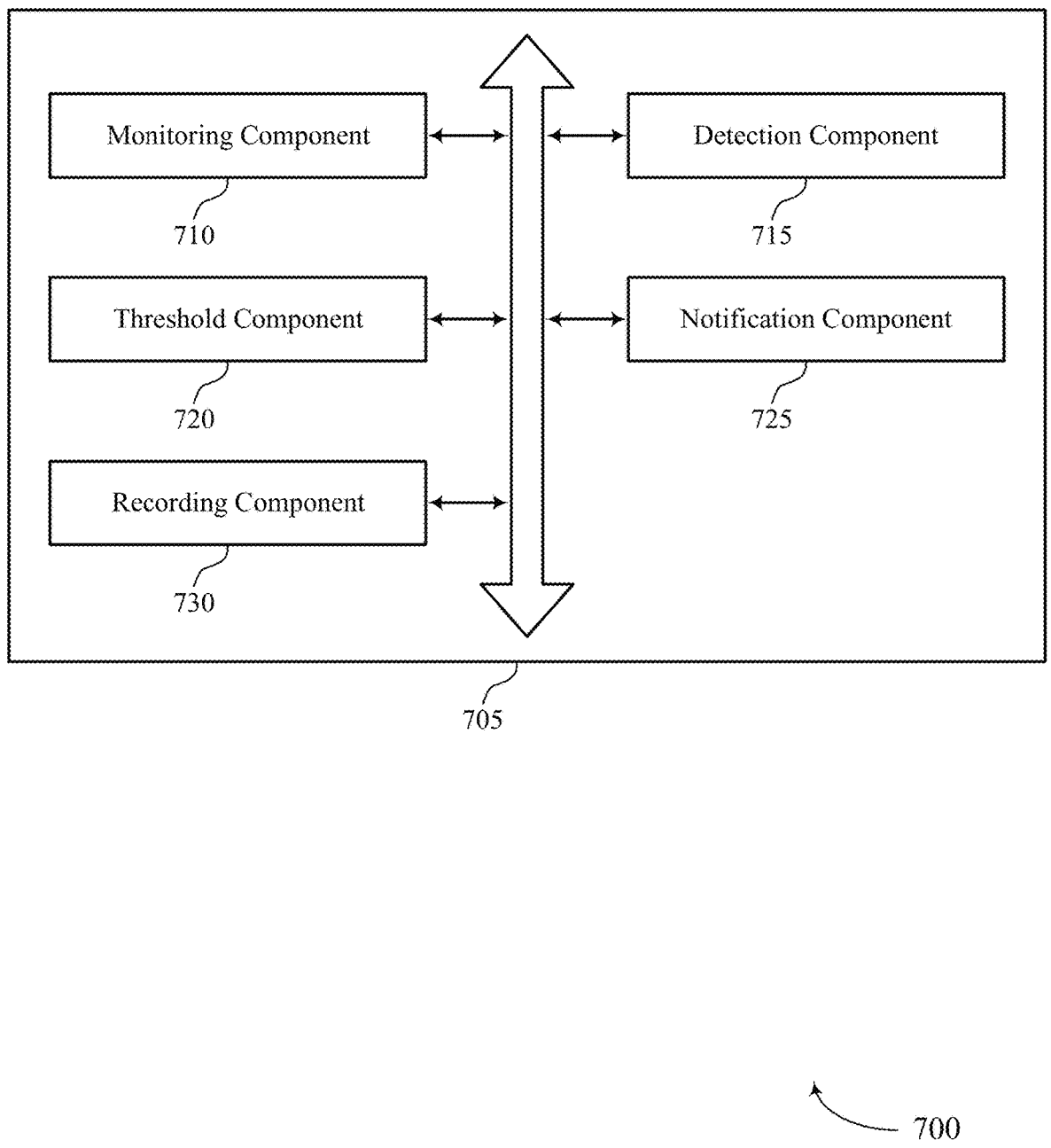
FIG. 7 shows a block diagram of a controller that supports techniques for intruder detection in accordance with aspects of the present disclosure.

FIG. 7 shows a block diagram 700 of a controller 705 that supports techniques for intruder detection in accordance with aspects of the present disclosure. The controller 705 may be an example of aspects of a controller 515, a controller 615, or a controller 810 described herein. The controller 705 may include a monitoring component 710, a detection component 715, a threshold component 720, a notification component 725, and a recording component 730. Each of these modules may communicate, directly or indirectly, with one another (e.g., via one or more buses).

The monitoring component 710 may monitor, by a camera of the security and automation system, a zone within a field of view of the camera. In some cases, the camera is positioned on an exterior surface of a building on the premises. In some cases, the camera is located within a housing of a doorbell. In some cases, the zone within the field of view of the camera includes a porch, a yard adjacent to the building, a driveway, or any combination thereof. In some cases, the security and automation system includes a camera sensor, a motion sensor, a speaker, a control panel, a transceiver, a doorbell, a light, or any combination thereof.

The detection component 715 may detect a presence of a person in the zone based on the monitoring. In some examples, the detection component 715 may detect, by a sensor, a motion associated with the person in the zone based on the monitoring. In some examples, the detection component 715 may identify one or more characteristics of the presence based on detecting the motion. In some examples, the detection component 715 may determine the presence corresponds to the person based on identifying the one or more characteristics. In some cases, the one or more characteristics include one or more facial features of the person, a profile associated with the person, a gait associated with the detected motion, a speed associated with the detected motion, a direction associated with the detected motion, or any combination thereof.

The threshold component 720 may determine the person has remained in the zone for a threshold duration after the detecting. The notification component 725 may generate, via the security and automation system, an audiovisual notification based on determining the person has remained in the zone for the threshold duration. In some examples, the notification component 725 may determine a second notification based on determining the person has remained in the zone for the threshold duration. In some examples, the notification component 725 may transmit the second notification to one or more devices associated with the security and automation system. In some examples, the notification component 725 may receive a response to the second notification. In some examples, the notification component 725 may generate a third audiovisual notification based on receiving the response.

In some cases, the response includes at least one of a command, a text message, a confirmation message, a verbal message, or any combination thereof. In some cases, the third audiovisual notification includes a tone, a spoken announcement, an activation of a light, a flashing pattern of the light, the verbal message, or any combination thereof. In some cases, the one or more devices include at least one of a communication interface of the home and automation system, a remote device associated with an occupant of the premises, a device associated with a network operations center, a device associated with an emergency response provider, or any combination thereof. In some cases, the audiovisual notification includes a tone, a spoken announcement, an activation of a light, a flashing pattern of the light, or any combination thereof.

The recording component 730 may initiate a video recording at the camera based on determining the person has remained in the zone for the threshold duration, where the audiovisual notification indicates the video recording has been initiated.

Figure 8:
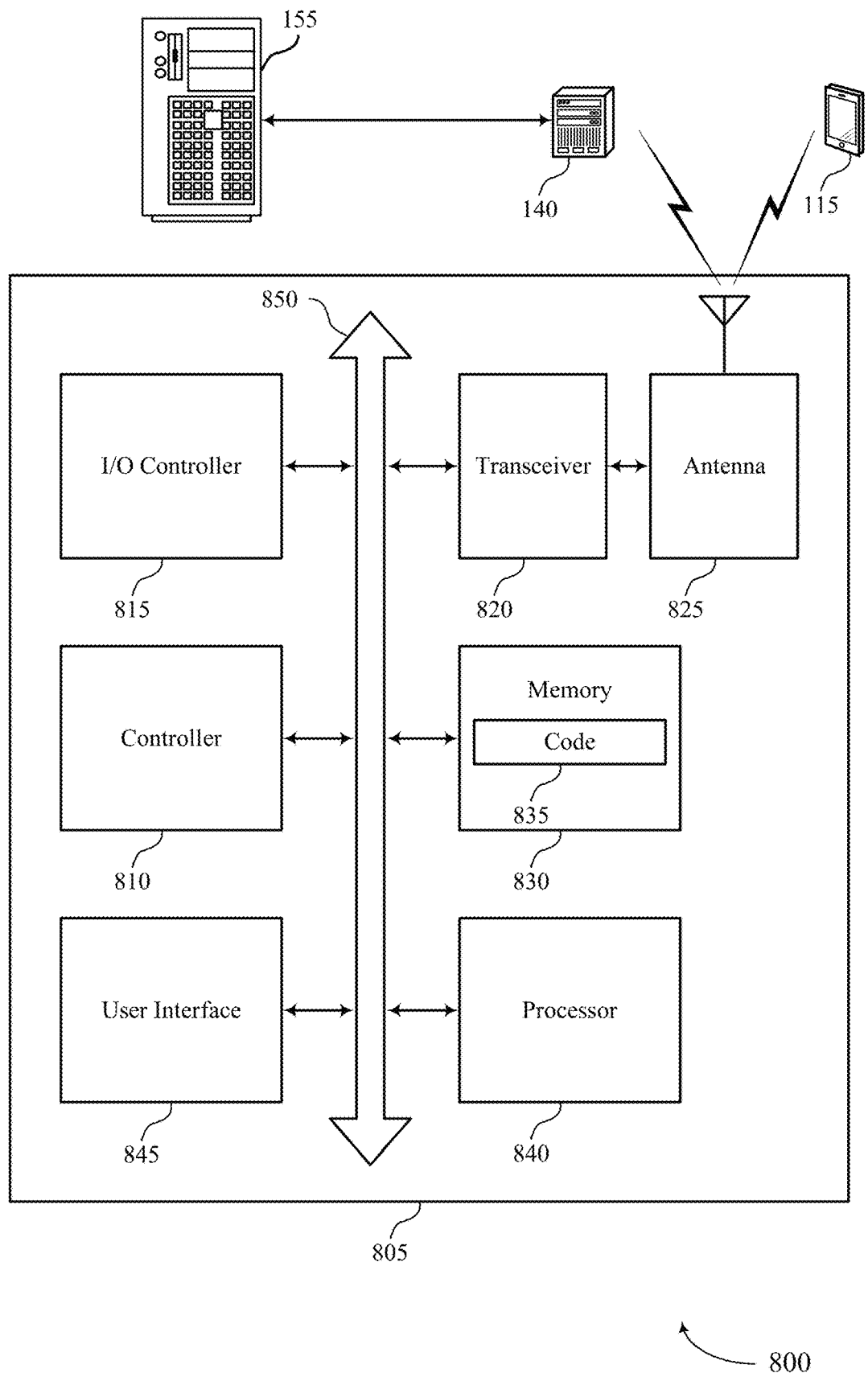
FIG. 8 shows a diagram of a system including a device that supports techniques for intruder detection in accordance with aspects of the present disclosure.

FIG. 8 shows a diagram of a system 800 including a device 805 that supports techniques for intruder detection in accordance with aspects of the present disclosure. The device 805 may be an example of or include the components of device 505, device 605, or a control panel 135, a local computing device 115, 120, a server 155, or a remote computing device 140 as described herein. The device 805 may include components for bi-directional voice and data communications including components for transmitting and receiving communications, including a controller 810, an I/O controller 815, a transceiver 820, an antenna 825, memory 830, a processor 840, and a user interface 845. These components may be in electronic communication via one or more buses (e.g., bus 850).

In some cases, the device 805 may communicate with a remote computing device 140, and/or a remote server (e.g., a server 155). For example, one or more elements of the device 805 may provide a direct connection to the server 155 via a direct network link to the Internet via a POP (point of presence). In some cases, one element of the device 805 (e.g., one or more antennas, transceivers, etc.) may provide a connection using wireless techniques, including digital cellular telephone connection, Cellular Digital Packet Data (CDPD) connection, digital satellite data connection, and/or another connection.

Many other devices and/or subsystems may be connected to one or may be included as one or more elements of the system 800 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some cases, all of the elements shown in FIG. 8 need not be present to practice the present systems and methods. The devices and subsystems may also be interconnected in different ways from that shown in FIG. 8. In some cases, an aspect of the operations of the system 800 may be readily known in the art and are not discussed in detail in this disclosure.

The signals associated with the system 800 may include wireless communication signals such as radio frequency, electromagnetics, local area network (LAN), wide area network (WAN), virtual private network (VPN), wireless network (using 802.11, for example), 345 MHZ, Z-WAVE®, cellular network (using 3G and/or Long Term Evolution (LTE), for example), and/or other signals. The radio access technology (RAT) of the system 800 may be related to, but are not limited to, wireless wide area network (WWAN) (GSM, CDMA, and WCDMA), wireless local area network (WLAN) (including user equipment (UE) BLUETOOTH® and Wi-Fi), WMAN (WiMAX), antennas for mobile communications, antennas for Wireless Personal Area Network (WPAN) applications (including RFID and UWB). In some cases, one or more sensors (e.g., motion, proximity, smoke, light, glass break, door, window, carbon monoxide, and/or another sensor) may connect to some element of the system 800 via a network using the one or more wired and/or wireless connections.

The controller 810 may monitor, by a camera of the security and automation system, a zone within a field of view of the camera, detect a presence of a person in the zone based on the monitoring, determine the person has remained in the zone for a threshold duration after the detecting, and generate, via the security and automation system, an audiovisual notification based on determining the person has remained in the zone for the threshold duration.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for intruder detection).

The code 835 may include instructions to implement aspects of the present disclosure, including instructions to support intruder detection. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The user interface 845 may enable a user to interact with the device 805. In some cases, the user interface 845 may include an audio device, such as an external speaker system. In some cases the user interface 845 may include a keyboard, a mouse, a touchscreen, an external display device such as a display screen, or an input device (e.g., a remote control device interfaced with the user interface 845 directly or through the I/O controller 815).

Figure 9:
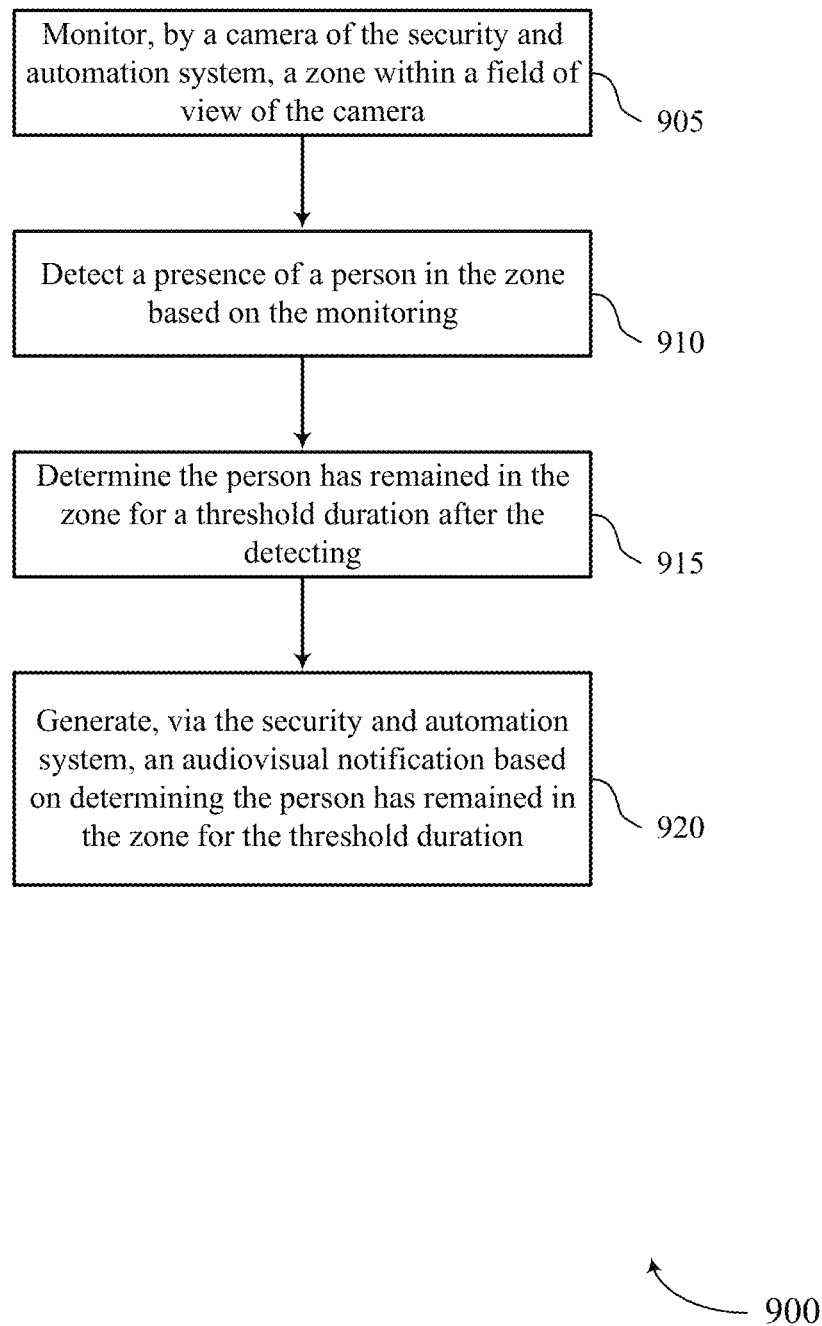
FIGS. 9 through 11 show flowcharts illustrating methods that support techniques for intruder detection in accordance with aspects of the present disclosure.

FIG. 9 shows a flowchart illustrating a method 900 that supports techniques for intruder detection in accordance with aspects of the present disclosure. The operations of method 900 may be implemented by a device of a security and automation system (e.g., a control panel 135, a local computing device 115, 120, a server 155, or a remote computing device 140) or its components as described herein. For example, the operations of method 900 may be performed by a controller as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 905, the device may monitor, by a camera of the security and automation system, a zone within a field of view of the camera. The operations of 905 may be performed according to the methods described herein. In some examples, aspects of the operations of 905 may be performed by a monitoring component as described with reference to FIGS. 5 through 8.

At 910, the device may detect a presence of a person in the zone based on the monitoring. The operations of 910 may be performed according to the methods described herein. In some examples, aspects of the operations of 910 may be performed by a detection component as described with reference to FIGS. 5 through 8.

At 915, the device may determine the person has remained in the zone for a threshold duration after the detecting. The operations of 915 may be performed according to the methods described herein. In some examples, aspects of the operations of 915 may be performed by a threshold component as described with reference to FIGS. 5 through 8.

At 920, the device may generate, via the security and automation system, an audiovisual notification based on determining the person has remained in the zone for the threshold duration. The operations of 920 may be performed according to the methods described herein. In some examples, aspects of the operations of 920 may be performed by a notification component as described with reference to FIGS. 5 through 8.

Figure 10:
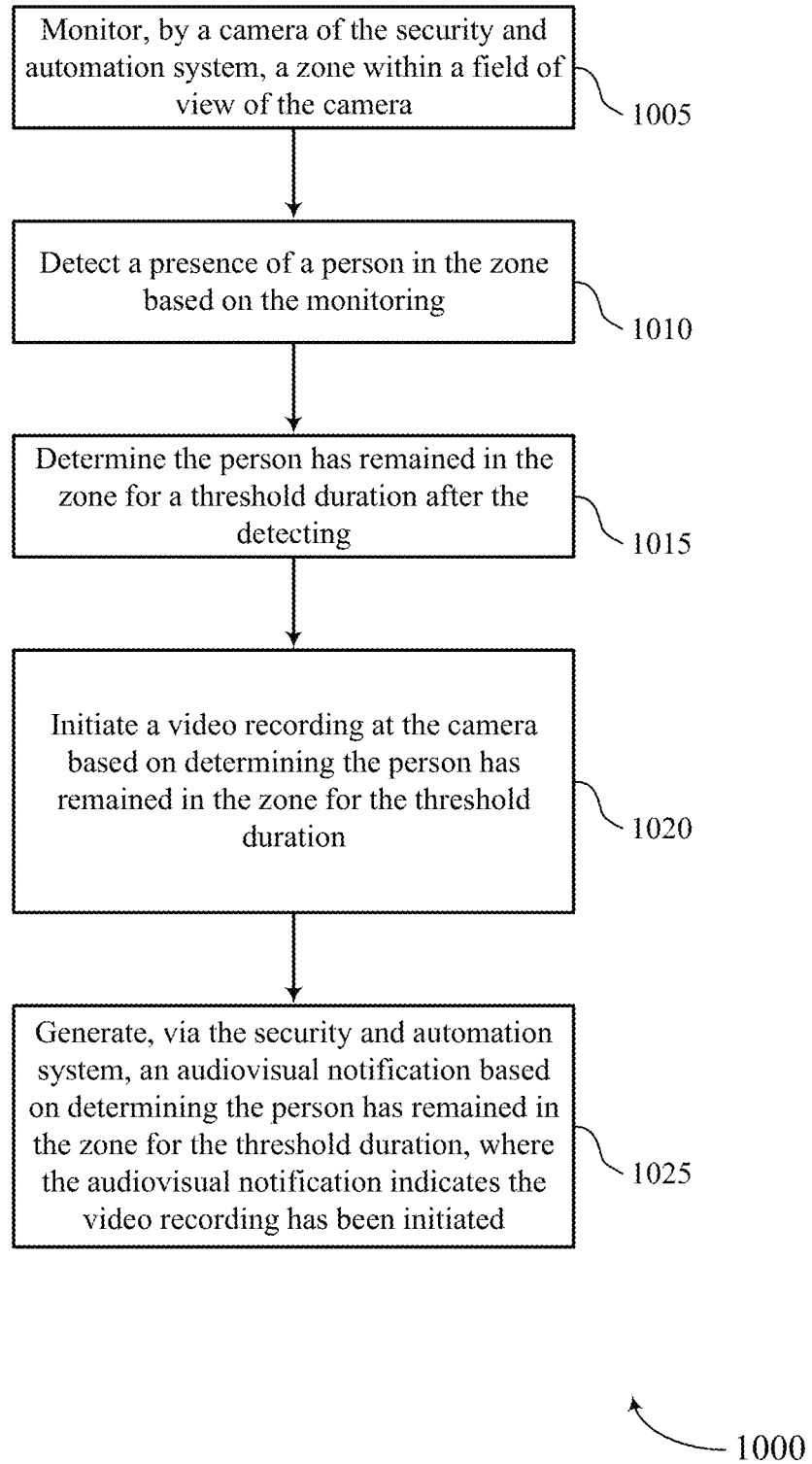

FIG. 10 shows a flowchart illustrating a method 1000 that supports techniques for intruder detection in accordance with aspects of the present disclosure. The operations of method 1000 may be implemented by a device of a security and automation system (e.g., a control panel 135, a local computing device 115, 120, a server 155, or a remote computing device 140) or its components as described herein. For example, the operations of method 1000 may be performed by a controller as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1005, the device may monitor, by a camera of the security and automation system, a zone within a field of view of the camera. The operations of 1005 may be performed according to the methods described herein. In some examples, aspects of the operations of 1005 may be performed by a monitoring component as described with reference to FIGS. 5 through 8.

At 1010, the device may detect a presence of a person in the zone based on the monitoring. The operations of 1010 may be performed according to the methods described herein. In some examples, aspects of the operations of 1010 may be performed by a detection component as described with reference to FIGS. 5 through 8.

At 1015, the device may determine the person has remained in the zone for a threshold duration after the detecting. The operations of 1015 may be performed according to the methods described herein. In some examples, aspects of the operations of 1015 may be performed by a threshold component as described with reference to FIGS. 5 through 8.

At 1020, the device may initiate a video recording at the camera based on determining the person has remained in the zone for the threshold duration, where the audiovisual notification indicates the video recording has been initiated. The operations of 1020 may be performed according to the methods described herein. In some examples, aspects of the operations of 1020 may be performed by a recording component as described with reference to FIGS. 5 through 8.

At 1025, the device may generate, via the security and automation system, an audiovisual notification based on determining the person has remained in the zone for the threshold duration. The operations of 1025 may be performed according to the methods described herein. In some examples, aspects of the operations of 1025 may be performed by a notification component as described with reference to FIGS. 5 through 8.

Figure 11:
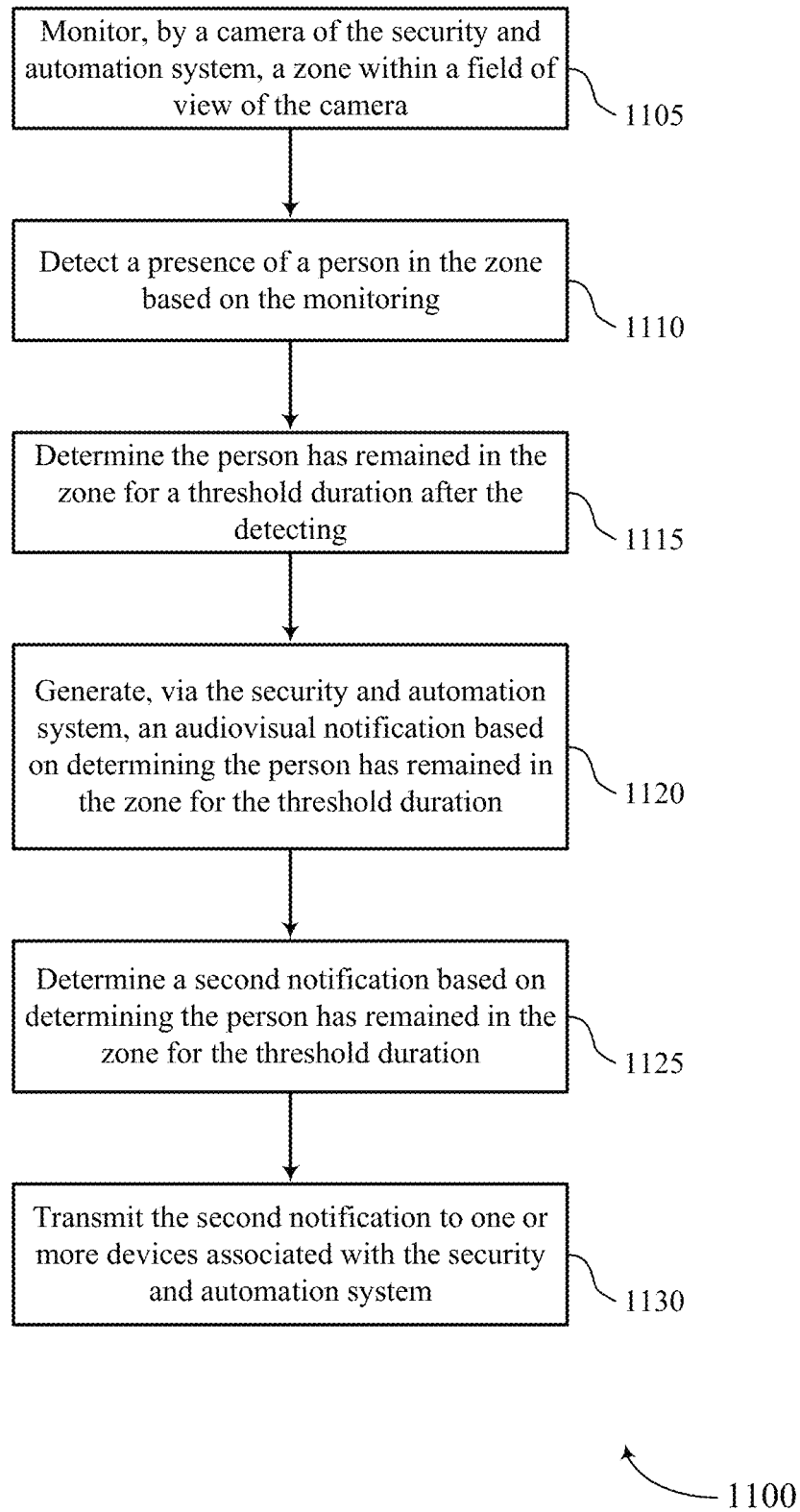

FIG. 11 shows a flowchart illustrating a method 1100 that supports techniques for intruder detection in accordance with aspects of the present disclosure. The operations of method 1100 may be implemented by a device of a security and automation system (e.g., a control panel 135, a local computing device 115, 120, a server 155, or a remote computing device 140) or its components as described herein. For example, the operations of method 1100 may be performed by a controller as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1105, the device may monitor, by a camera of the security and automation system, a zone within a field of view of the camera. The operations of 1105 may be performed according to the methods described herein. In some examples, aspects of the operations of 1105 may be performed by a monitoring component as described with reference to FIGS. 5 through 8.

At 1110, the device may detect a presence of a person in the zone based on the monitoring. The operations of 1110 may be performed according to the methods described herein. In some examples, aspects of the operations of 1110 may be performed by a detection component as described with reference to FIGS. 5 through 8.

At 1115, the device may determine the person has remained in the zone for a threshold duration after the detecting. The operations of 1115 may be performed according to the methods described herein. In some examples, aspects of the operations of 1115 may be performed by a threshold component as described with reference to FIGS. 5 through 8.

At 1120, the device may generate, via the security and automation system, an audiovisual notification based on determining the person has remained in the zone for the threshold duration. The operations of 1120 may be performed according to the methods described herein. In some examples, aspects of the operations of 1120 may be performed by a notification component as described with reference to FIGS. 5 through 8.

At 1125, the device may determine a second notification based on determining the person has remained in the zone for the threshold duration. The operations of 1125 may be performed according to the methods described herein. In some examples, aspects of the operations of 1125 may be performed by a notification component as described with reference to FIGS. 5 through 8.

At 1130, the device may transmit the second notification to one or more devices associated with the security and automation system. The operations of 1130 may be performed according to the methods described herein. In some examples, aspects of the operations of 1130 may be performed by a notification component as described with reference to FIGS. 5 through 8.

The detailed description set forth herein in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration. An operating system utilized by the processor (or by I/O controller module or another module described above) may be iOS®, ANDROID®, MS-DOS®, MS-WINDOWS®, OS/2®, UNIX®, LINUX®, or another known operating system.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone: B alone: C alone: A and B in combination: A and C in combination: B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some cases, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various cases have been described and/or illustrated here in the context of fully functional computing systems, one or more of these exemplary cases may be distributed as a program product in a variety of forms, regardless of the particular type of computer-readable media used to actually carry out the distribution. The cases disclosed herein may also be implemented using software modules that perform certain tasks. These software modules may include script, batch, or other executable files that may be stored on a computer-readable storage medium or in a computing system. In some cases, these software modules may permit and/or instruct a computing system to perform one or more of the exemplary cases disclosed here.

This description, for purposes of explanation, has been described with reference to specific cases. The illustrative discussions above, however, are not intended to be exhaustive or limit the present systems and methods to the precise forms discussed. Many modifications and variations are possible in view of the above teachings. The cases were chosen and described in order to explain the principles of the present systems and methods and their practical applications, to enable others skilled in the art to utilize the present systems, apparatus, and methods and various cases with various modifications as may be suited to the particular use contemplated.

What is claimed is:
1. A method for intruder detection at a security and automation system associated with a premises, the method being performed by a computing device comprising at least one processor, the method comprising:
   monitoring, by a camera of the security and automation system, an interior room of the premises within a field of view of the camera;
   detecting motion in the room from a first source of motion based at least in part on the monitoring;
   determining that the first source of motion indicates a person based at least in part on a characteristic of the motion of the first source of motion within the room, a second source of additional motion within the room, or a combination thereof;
   determining a mode of operation for the security and automation system based on an occupancy of the premises, the mode set based on detection of an exit event corresponding to the premises;
   determining the person has remained in the room for a threshold duration after the detecting, wherein the threshold duration is shorter in a first mode and the threshold duration is longer in a second mode;
   initiating a video capture at the camera in response to determining that the person has remained in the room for the threshold duration; and generating, via the security and automation system, an audiovisual notification based at least in part on determining the person has remained in the room for the threshold duration.

2. The method of claim 1, wherein the audiovisual notification indicates the video capture has been initiated.

3. The method of claim 1, further comprising:
determining a second notification based at least in part on determining the person has remained in the room for the threshold duration; and
transmitting the second notification to one or more devices associated with the security and automation system.

4. The method of claim 3, further comprising:
receiving a response to the second notification; and
generating a third audiovisual notification based at least in part on receiving the response.

5. The method of claim 4, wherein:
the response comprises at least one of a command, a text message, a confirmation message, a verbal message, or any combination thereof; and
the third audiovisual notification comprises a tone, a spoken announcement, an activation of a light, a flashing pattern of the light, the verbal message, or any combination thereof.

6. The method of claim 3, wherein the one or more devices comprise at least one of a communication interface of the security and automation system, a remote device associated with an occupant of the premises, a device associated with a network operations center, a device associated with an emergency response provider, or any combination thereof.

7. The method of claim 1, wherein determining that the first source of motion indicates the person comprises:
detecting, by a sensor, a motion associated with the person in the room based at least in part on the monitoring;
identifying one or more characteristics of the presence based at least in part on detecting the motion; and
determining that the first source of motion indicates the person is based at least in part on identifying the one or more characteristics.

8. The method of claim 7, wherein the one or more characteristics comprise one or more facial features of the person, a profile associated with the person, a gait associated with the detected motion, a speed associated with the detected motion, a direction associated with the detected motion, or any combination thereof.

9. The method of claim 1, wherein the camera is positioned on an exterior surface of a building on the premises.

10. The method of claim 9, wherein the camera is located within a housing of a doorbell.

11. The method of claim 1, wherein the audiovisual notification comprises a tone, a spoken announcement, an activation of a light, a flashing pattern of the light, or any combination thereof.

12. The method of claim 1, wherein the security and automation system comprises a camera sensor, a motion sensor, a speaker, a control panel, a transceiver, a doorbell, a light, or any combination thereof.

13. An apparatus for intruder detection at a security and automation system associated with a premises, the apparatus comprising:
a processor;
memory coupled with the processor; and
instructions stored in the memory and executable by the processor to cause the apparatus to:
monitor, by a camera of the security and automation system, an interior room of the premises within a field of view of the camera;
detect motion in the room from a first source of motion based at least in part on the monitoring;
determine that the first source of motion indicates a person based at least in part on a characteristic of the motion of the first source of motion within the room, a second source of additional motion within the room, or a combination thereof;
determine a mode of operation for the security and automation system based on an occupancy of the premises, the mode set based on detection of an exit event corresponding to the premises;
determine the person has remained in the room for a threshold duration after the detecting, wherein the threshold duration is shorter in a first mode and the threshold duration is longer in a second mode;
initiate a video capture at the camera in response to determining that the person has remained in the room for the threshold duration; and
generate an audiovisual notification based at least in part on determining the person has remained in the room for the threshold duration.

14. The apparatus of claim 13, wherein the audiovisual notification indicates the video capture has been initiated.

15. The apparatus of claim 13, wherein the instructions are further executable by the processor to cause the apparatus to:
determine a second notification based at least in part on determining the person has remained in the room for the threshold duration; and
transmit the second notification to one or more devices associated with the security and automation system.

16. The apparatus of claim 15, wherein the instructions are further executable by the processor to cause the apparatus to:
receive a response to the second notification; and
generate a third audiovisual notification based at least in part on receiving the response.

17. The apparatus of claim 15, wherein the one or more devices comprise at least one of a communication interface of the security and automation system, a remote device associated with an occupant of the premises, a device associated with a network operations center, a device associated with an emergency response provider, or any combination thereof.

18. A non-transitory computer-readable medium storing code, the code comprising instructions executable by a processor of a security and automation system to:
monitor, by a camera of the security and automation system, an interior room of a premises within a field of view of the camera;
detect motion in the room from a first source of motion based at least in part on the monitoring;
determine that the first source of motion indicates a person based at least in part on a characteristic of the motion of the first source of motion within the room, a second source of additional motion within the room, or a combination thereof;
determine a mode of operation for the security and automation system based on an occupancy of the premises, the mode set based on detection of an exit event corresponding to the premises;
determine the person has remained in the room for a threshold duration after the detecting, wherein the threshold duration is shorter in a first mode and the threshold duration is longer in a second mode;

initiate a video capture at the camera in response to determining that the person has remained in the room for the threshold duration; and generate an audiovisual notification based at least in part on determining the person has remained in the room for the threshold duration.

19. The non-transitory computer-readable medium of claim 18, wherein the audiovisual notification indicates the video capture has been initiated.

20. The non-transitory computer-readable medium of claim 18, wherein at least one of the threshold duration in the first mode or the threshold duration in the second mode is input by a user.

* * * * *